(12) United States Patent
Orlando et al.

(10) Patent No.: US 7,752,836 B2
(45) Date of Patent: Jul. 13, 2010

(54) GAS TURBINE ASSEMBLY AND METHODS OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 673 days.

(21) Appl. No.: 11/253,495

(22) Filed: Oct. 19, 2005

(65) Prior Publication Data

US 2007/0087892 A1    Apr. 19, 2007

(51) Int. Cl.
    *F02K 3/00*    (2006.01)
(52) U.S. Cl. ...................................... 60/268; 60/39.162
(58) Field of Classification Search .................. 60/268, 60/228, 226.1, 39.162; 415/9, 174.4; 416/2
    See application file for complete search history.

(56) References Cited

U.S. PATENT DOCUMENTS

| | | | |
|---|---|---|---|
| 3,853,432 A * | 12/1974 | Cronstedt | 417/405 |
| 4,010,608 A * | 3/1977 | Simmons | 60/226.3 |
| 4,251,987 A * | 2/1981 | Adamson | 60/805 |
| 4,751,816 A * | 6/1988 | Perry | 60/226.1 |
| 4,887,424 A | 12/1989 | Geidel et al. | |
| 5,010,729 A * | 4/1991 | Adamson et al. | 60/226.1 |
| 5,806,303 A | 9/1998 | Johnson | |
| 5,809,772 A | 9/1998 | Giffin, III et al. | |
| 5,813,214 A | 9/1998 | Moniz et al. | |
| 5,867,980 A | 2/1999 | Bartos | |
| 6,619,030 B1 | 9/2003 | Seda et al. | |
| 6,684,626 B1 | 2/2004 | Orlando et al. | |
| 6,711,887 B2 | 3/2004 | Orlando et al. | |
| 6,732,502 B2 | 5/2004 | Seda et al. | |
| 6,739,120 B2 | 5/2004 | Moniz et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |
| 2004/0255590 A1 | 12/2004 | Rago et al. | |

FOREIGN PATENT DOCUMENTS

| | | |
|---|---|---|
| DE | 3933776 A1 | 4/1991 |
| DE | 3941852 A1 | 6/1991 |
| EP | 0558769 A1 | 9/1993 |
| EP | 0867607 A1 | 9/1998 |
| JP | 11-101315 A | 4/1999 |

OTHER PUBLICATIONS

European Patent Office, European Search Report for Application No. 06255327.6, Mar. 9, 2010, 7 pages, EP.

* cited by examiner

*Primary Examiner*—Michael Cuff
*Assistant Examiner*—Andrew Nguyen
(74) *Attorney, Agent, or Firm*—William Scott Andes, Esq.; Armstrong Teasdale LLP

(57) ABSTRACT

A method for assembling a gas turbine engine includes coupling a gearbox to a low-pressure turbine, the gearbox includes a plurality of planetary gears intermeshed with the sun gear, each of the planetary gears includes a first gear portion having a first diameter and a second gear portion having a second diameter that is different than the first diameter.

17 Claims, 7 Drawing Sheets

GAS TURBINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned aft of the high-pressure turbine. The low-pressure turbine includes a rotor assembly coupled to a fan using a drive shaft. The low-pressure turbine rotatably drives the fan through the drive shaft. To facilitate increasing engine efficiency, at least one known gas turbine engine includes a counter-rotating low-pressure turbine that is coupled to a counter-rotating fan and a booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. Accordingly, the overall weight, design complexity and/or manufacturing costs of such an engine are increased.

BRIEF DESCRIPTION OF THE FIGURES

In one aspect, a method for assembling a gas turbine engine is provided. The method includes coupling a gearbox to a low-pressure turbine, the gearbox includes a plurality of planetary gears intermeshed with the sun gear, each of the planetary gears includes a first gear portion having a first diameter and a second gear portion having a second diameter that is different than the first diameter.

In another aspect, a counter-rotating fan assembly is provided. The counter-rotating fan assembly includes a gearbox comprising a sun gear coupled to a low-pressure turbine, and a plurality of planetary gears intermeshed with the sun gear, each of the planetary gears comprising a first gear portion having a first diameter and a second gear portion having a second diameter that is different than the first diameter.

In a further aspect, a turbine engine assembly is provided. The turbine engine assembly includes a core turbine engine, a low-pressure turbine coupled to the core turbine engine, a gearbox coupled to the low-pressure turbine, and a counter-rotating fan assembly coupled to the gearbox. The gearbox includes a sun gear and a plurality of planetary gears intermeshed with the sun gear, each of the planetary gears includes a first gear portion having a first diameter and a second gear portion having a second diameter that is different than the first diameter.

BRIEF DESCRIPTION OF THE DRAWINGS

Figure 1:
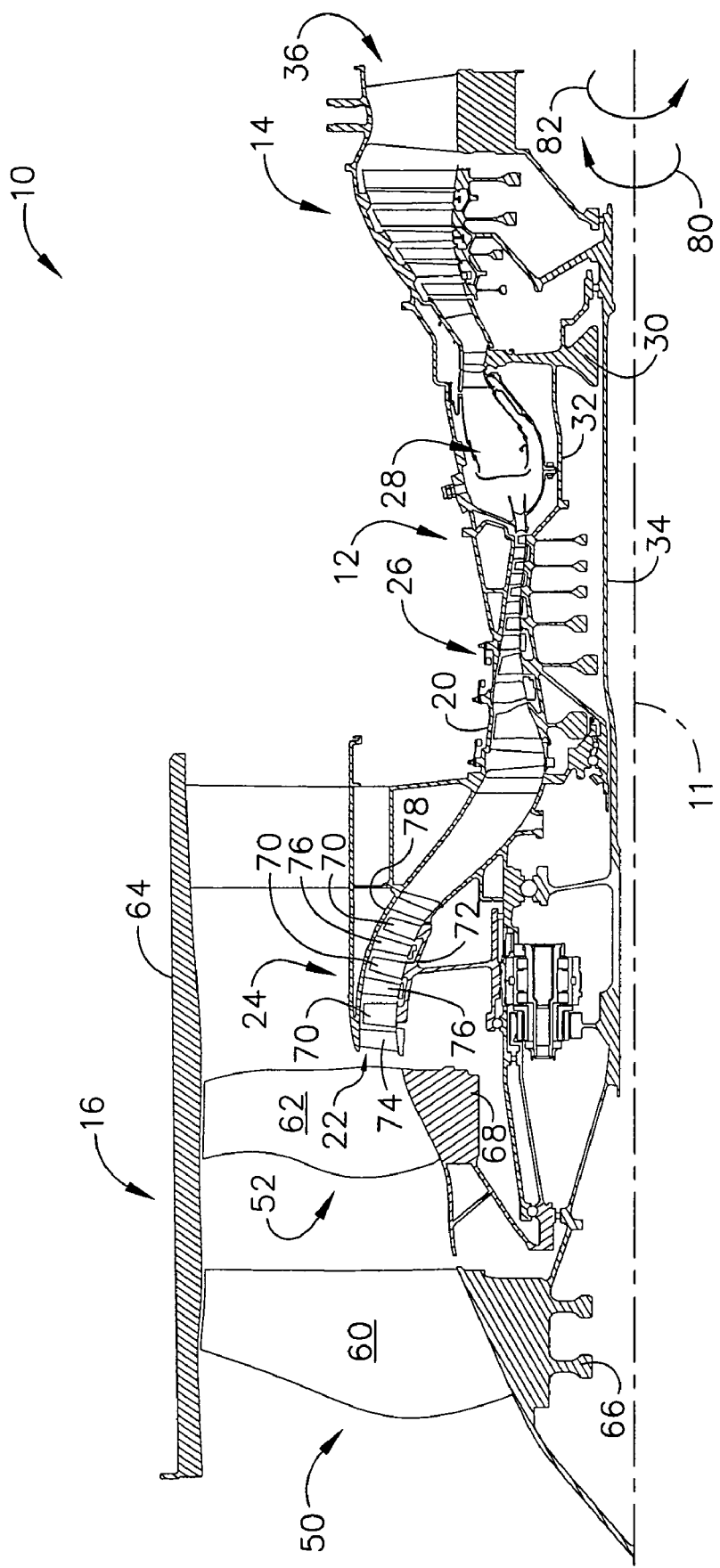
Figure 2:
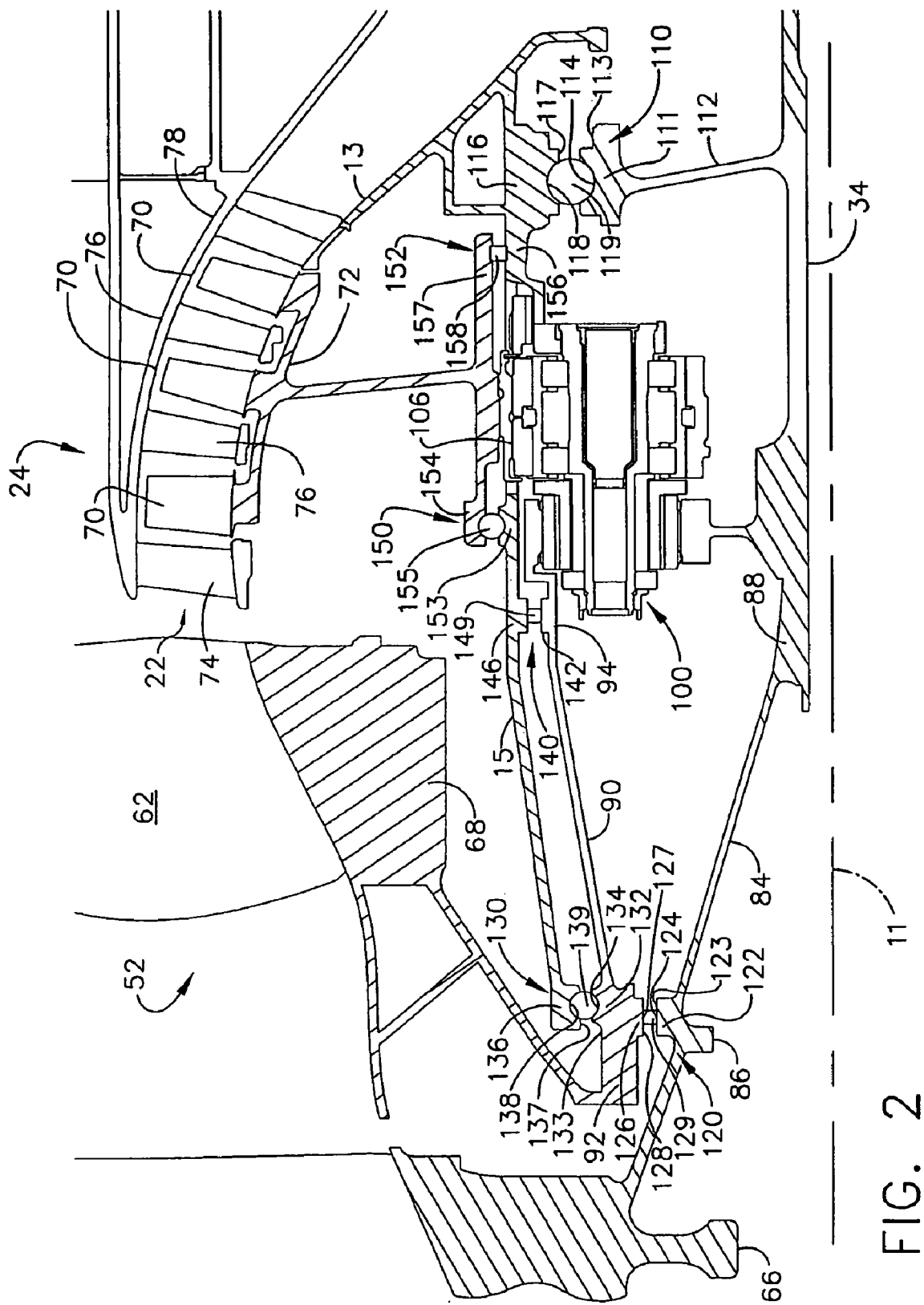
Figure 3:
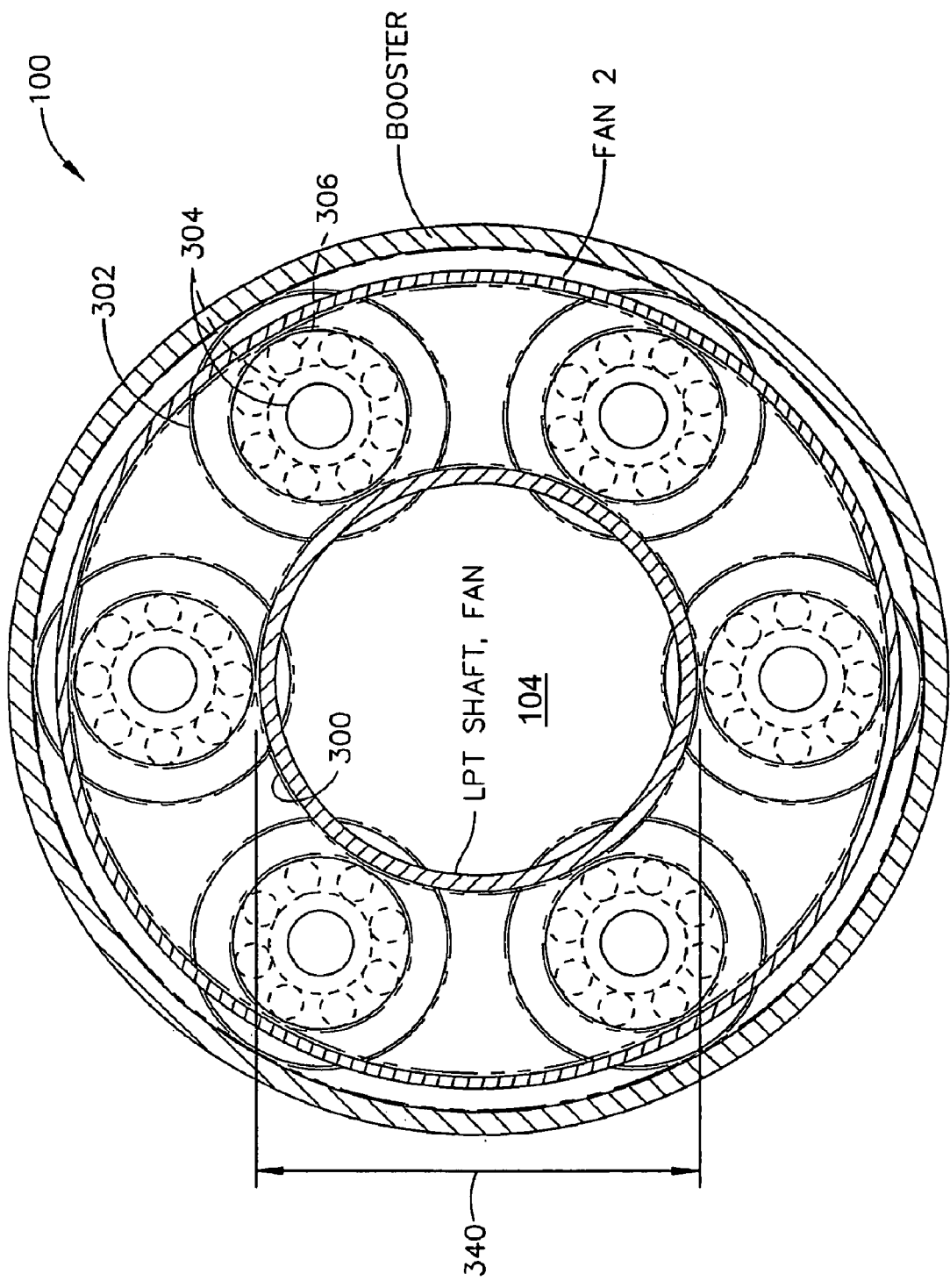
Figure 4:
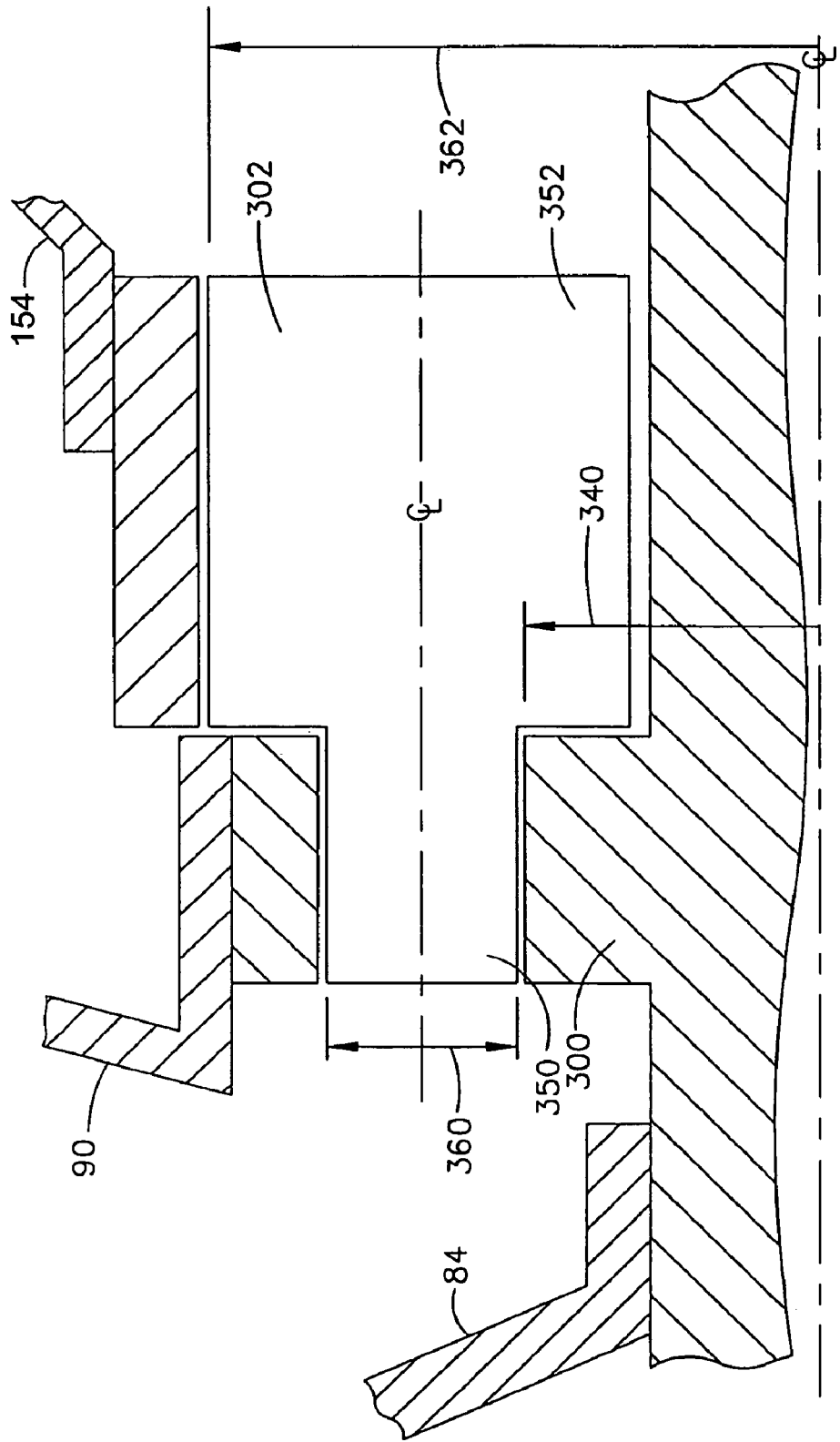
Figure 5:
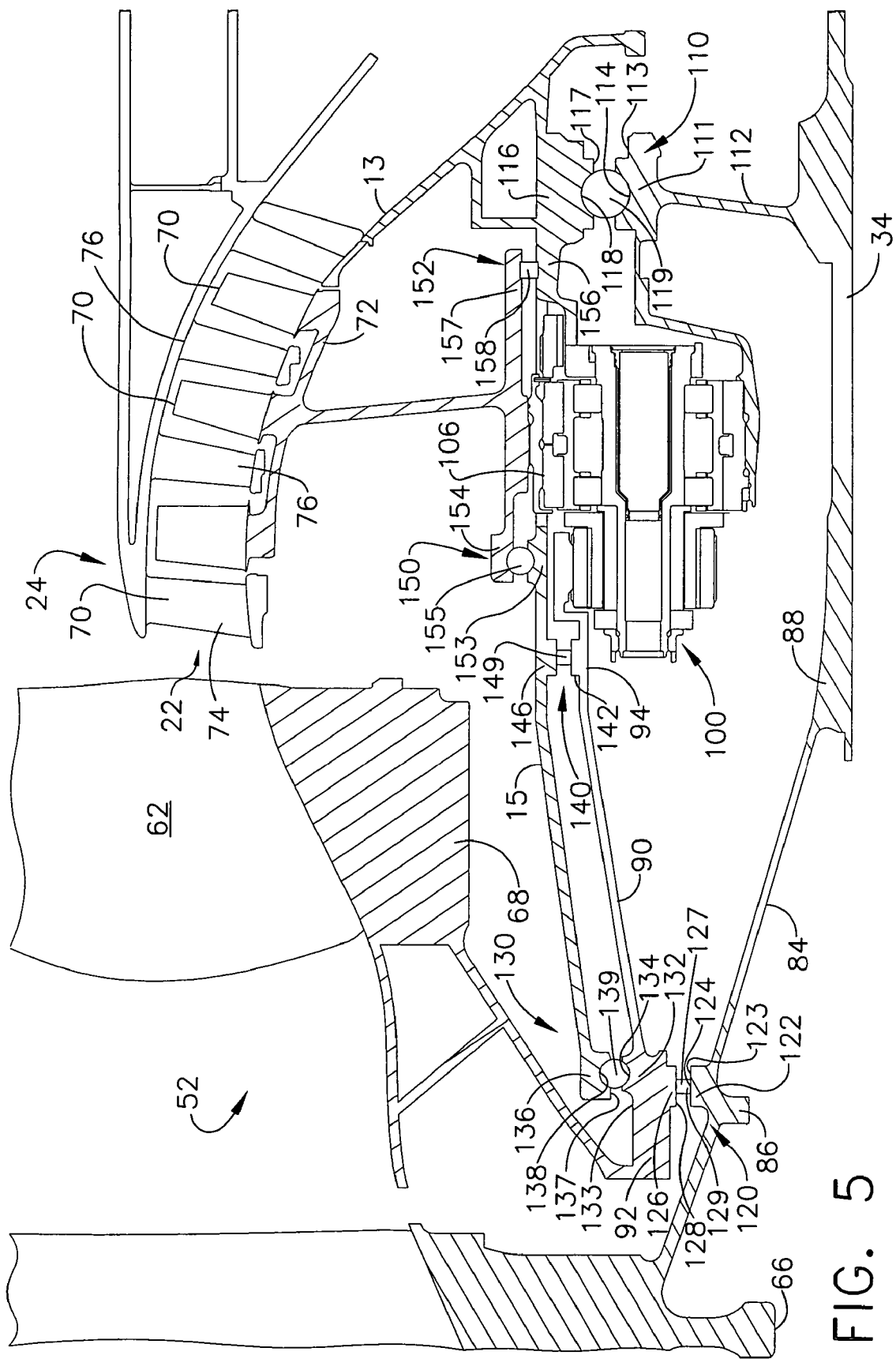
Figure 6:
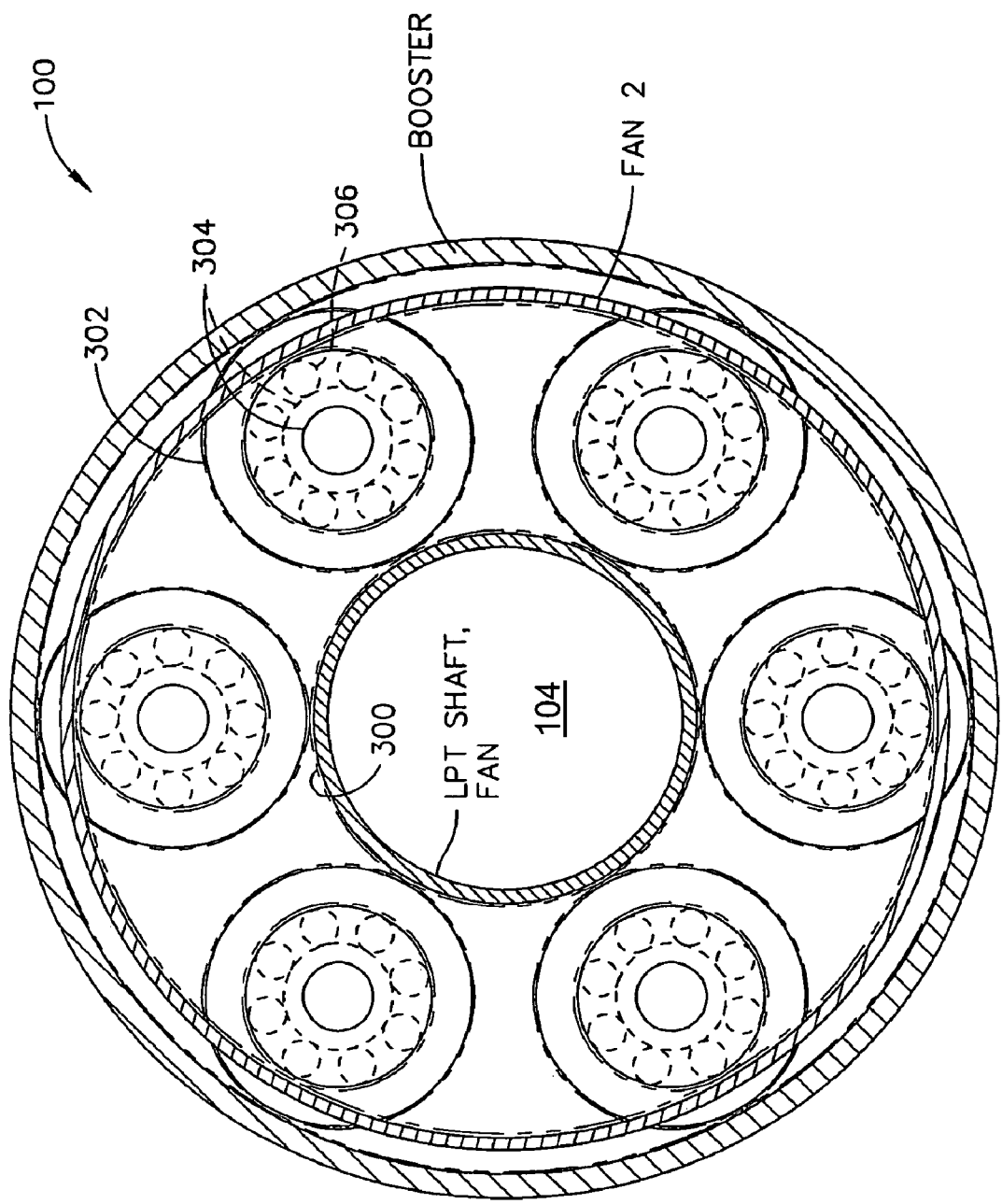

FIG. 1 is a cross-sectional view of a portion of an exemplary turbine engine assembly;

FIG. 2 is an enlarged cross-sectional view of a portion of a counter-rotating fan assembly shown in FIG. 1;

FIG. 3 is an end view of the gearbox shown in FIG. 2;

FIG. 4 is a side view of a portion of the gearbox shown in FIG. 3;

FIG. 5 is a cross-sectional view of a portion of an exemplary turbine engine assembly;

FIG. 6 is an end view of the gearbox shown in FIG. 5; and

Figure 7:
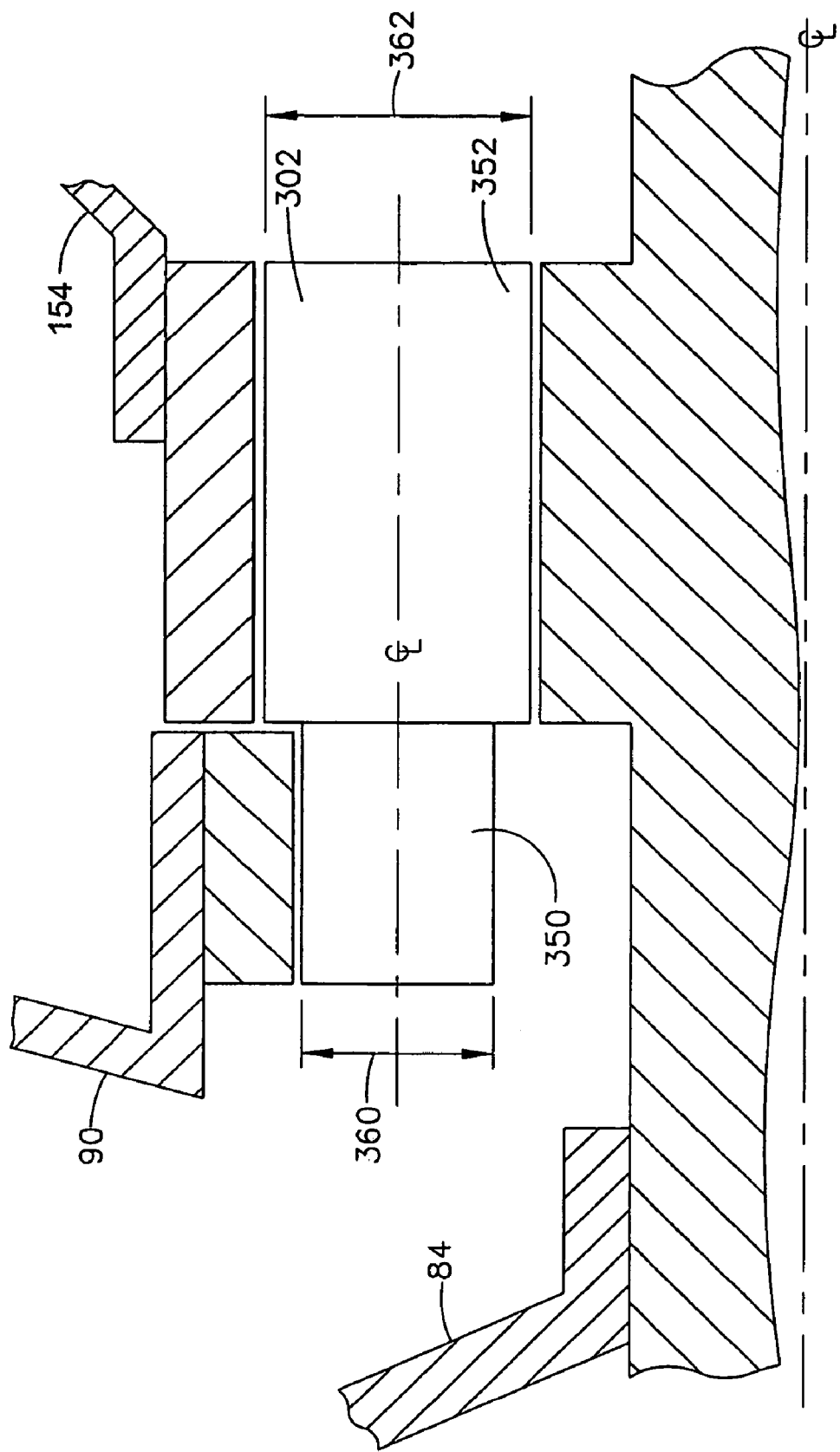

FIG. 7 is a side view of a portion of the gearbox shown in FIG. 3.

DETAILED DESCRIPTION OF THE INVENTION

FIG. 1 is a cross-sectional view of a portion of an exemplary turbine engine assembly 10 having a longitudinal axis 11. In the exemplary embodiment, turbine engine assembly 10 includes a core gas turbine engine 12 generally defined by a frame 13. A low-pressure turbine 14 is coupled axially aft of core gas turbine engine 12 and a counter-rotating fan assembly 16 is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, core gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first rotatable drive shaft 32, and then to second or low-pressure turbine 14 to facilitate driving counter-rotating fan assembly 16 and booster compressor 24 through a second rotatable drive shaft 34 that is coupled coaxially with first drive shaft 32. After driving low-pressure turbine 14, the combustion products leave turbine engine assembly 10 through an exhaust nozzle 36 to provide propulsive jet thrust.

Counter-rotating fan assembly 16 includes a first or forward fan assembly 50 and a second or an aft fan assembly 52 configured to rotate about longitudinal axis 11. The terms "forward fan" and "aft fan" are used herein to indicate that fan assembly 50 is coupled axially upstream from fan assembly 52. In one embodiment, fan assemblies 50 and 52 are positioned at a forward end of core gas turbine engine 12, as shown in FIGS. 1-3. In an alternative embodiment, fan assemblies 50 and 52 are positioned at an aft end of core gas turbine engine 12. Fan assemblies 50 and 52 each includes at least one row of rotor blades 60 and 62, respectively, and are positioned within a nacelle 64. Rotor blades 60 are coupled to rotor disk 66 and rotor blades 62 are coupled to rotor disk 68.

In one embodiment, booster compressor 24 is positioned aft of aft fan assembly 52 and includes a plurality of rows of rotor blades 70 that are coupled to a respective rotor disk 72. Although booster compressor 24 is shown as having only three rows of rotor blades 70, booster compressor 24 may have any suitable number and/or rows of rotor blades 70, such as a single row of rotor blades 70 or a plurality of rows of rotor blades 70 that are interdigitated with a plurality of rows of guide vanes 76. In one embodiment, inlet guide vanes 76 are fixedly or securely coupled to a booster case 78. In an alternative embodiment, rotor blades 70 are rotatably coupled to rotor disk 72 such that inlet guide vanes 76 are movable during engine operation to facilitate varying a quantity of air channeled through booster compressor 24. In another alternative embodiment, turbine engine assembly 10 does not include booster compressor 24.

As shown in FIG. 1, low-pressure turbine 14 is coupled to forward fan assembly 50 through shaft 34 such that forward fan assembly 50 rotates in a first rotational direction 80. Aft fan assembly 52 and booster compressor 24 are each coupled to drive shaft 34 and thus low-pressure turbine 14, via a gearbox 100, such that aft fan assembly 52 and booster compressor 24 each rotate in an opposite second rotational direction 82.

FIG. 2 is a schematic diagram of a portion of counter-rotating fan assembly 16 shown in FIG. 1. In one embodiment, first fan assembly 50 includes a cone 84 positioned about longitudinal axis 11. Cone 84 is connected at a first or forward end 86 to rotor disk 66 and at a second or aft end 88 to drive shaft 34, as shown in FIG. 2. Second fan assembly 52 includes a cone 90 positioned coaxially about at least a portion of cone 84 along longitudinal axis 11. Cone 90 is coupled at a first or forward end 92 to rotor disk 68 and at a second or aft end 94 to a first output 106 of a gearbox 100.

In one embodiment, counter-rotating fan assembly 16 also includes a gearbox 100 that is coupled between aft fan assembly 52 and drive shaft 34 to facilitate rotating aft fan assembly 52 and booster compressor 24 in opposite rotational direction 82 with respect to rotational direction 80 in which forward fan assembly 50 rotates. Gearbox 100 has a generally toroidal shape and is configured to be positioned circumferentially about drive shaft 34 to extend substantially about drive shaft 34.

In one embodiment, gearbox 100 has a gear ratio of approximately 2.0 to 1 such that forward fan assembly 50 rotates at a rotational speed that is approximately twice the rotational speed of either aft fan assembly 52 and/or booster compressor 24. In another embodiment, forward fan assembly 50 rotates with a rotational speed that is between approximately 0.67 and approximately 2.1 times faster than the rotational speed of aft fan assembly 52. In this embodiment, forward fan assembly 50 may rotate at a rotational speed greater than, equal to or less than the rotational speed of aft fan assembly 52.

In one embodiment, a first bearing assembly, such as thrust bearing assembly 110 as shown in FIGS. 1-2, is positioned about drive shaft 34 and/or longitudinal axis 11. Thrust bearing assembly 110 operatively couples and/or is mounted between drive shaft 34 and frame 13 of core gas turbine engine 12. Referring further to FIG. 2, in one embodiment, thrust bearing assembly 110 includes a radially positioned inner race 111 that is mounted with respect to drive shaft 34. As shown in FIG. 3, inner race 111 is mounted to a drive shaft extension 112 that is operatively coupled to drive shaft 34 so that inner race 111 is rotatable about longitudinal axis 11 with drive shaft 34. In one particular embodiment, drive shaft extension 112 is splined to drive shaft 34. Inner race 111 has a surface 113 defining an inner groove 114 of thrust bearing assembly 110. Surface 113 defining inner groove 114 has a generally arcuate profile.

Thrust bearing assembly 110 includes a radially positioned outer race 116 securely coupled to frame 13. In one embodiment, outer race 116 and/or frame 13 acts as a ground for the transfer of thrust loads and/or forces developed or generated by counter-rotating fan assembly 16 and/or booster compressor 24, as discussed in greater detail below. Outer race 116 has a surface 117, generally opposing surface 113, which forms an outer groove 118 of thrust bearing assembly 110. Surface 117 defining outer groove 118 has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to gearbox 100.

A second bearing assembly, such as roller bearing assembly 120, is positioned radially about longitudinal axis 11. In one embodiment, roller bearing assembly 120 operatively couples and/or is mounted between a forward end portion of first fan assembly 50, such as at or near forward end 86 of cone 84, and a forward end portion of second fan assembly 52, such as at or near forward end 92 of cone 90. In one embodiment, roller bearing assembly 120 includes a radially positioned inner race 122 that is mounted with respect to an outer surface of cone 84. As shown in FIG. 2, inner race 122 is mounted to cone 84 so that inner race 122 is rotatable about longitudinal axis 11 with first fan assembly 50. Inner race 122 has a surface 123 defining an inner groove 124 of roller bearing assembly 120. Surface 123 defining inner groove 124 has a generally arcuate profile.

Roller bearing assembly 120 includes a radially positioned outer race 126 that is mounted with respect to an inner surface of cone 90. As shown in FIG. 2, inner race 122 is mounted to cone 90 so that outer race 126 is rotatable about longitudinal axis 11 with second fan assembly 52. Outer race 126 has a surface 127, generally opposing surface 123, which forms an outer groove 128 of thrust bearing assembly 120. Surface 127 defining outer groove 128 has a generally arcuate profile. At least one roller element, such as a plurality of bearings 129, is movably positioned between inner race 122 and outer race 126. Each bearing 129 is in rolling contact with inner groove 124 and outer groove 128 to facilitate relative rotational movement of first fan assembly 50 and/or second fan assembly 52.

In one embodiment, bearing assemblies 110 and/or 120 facilitate maintaining forward fan assembly 50 and/or aft fan assembly 52 in a relatively fixed axial position. During operation of counter-rotating fan assembly 16, thrust loads and/or forces generated by first fan assembly 50 are transferred directly from first fan assembly 50 to first thrust bearing assembly 110. Further, thrust loads and/or forces generated by second fan assembly 52 and/or booster compressor 24 during operation are transferred from second fan assembly 52 and/or booster compressor 24 to second bearing assembly 120 and from second bearing assembly 120 through drive shaft 34 to first thrust bearing assembly 110. As a result of transferring thrust loads and/or forces to thrust bearing assembly 110 and/or thrust bearing assembly 120, the transfer of thrust loads and/or forces through gearbox 100, operatively coupled to second fan assembly 52, is prevented or limited. In alternative embodiments, any suitable bearing assembly known to those skilled in the art and guided by the teachings herein provided can be used for or in addition to bearing assembly 110 and/or bearing assembly 120.

In one embodiment, a bearing assembly, such as thrust bearing assembly 130, is positioned about the outer surface of cone 90 at or near forward end 92, as shown in FIG. 2. Thrust bearing assembly 130 is connected between frame 13 and forward end 92. In one embodiment, thrust bearing assembly 130 acts as a differential bearing assembly in combination with roller bearing assembly 120 to support second fan assembly 52 and/or transfer thrust loads and/or forces from second fan assembly 52 to frame 13. In one embodiment, thrust bearing assembly 130 includes an inner race 132 that is mounted with respect to cone 90, as shown in FIG. 2. Inner race 132 is mounted to forward end 92 of cone 90 so that inner race 132 is rotatable about longitudinal axis 11 with second fan assembly 52. Inner race 132 has a surface 133 defining an inner groove 134 of roller bearing assembly 130.

Thrust bearing assembly 130 includes an outer race 136 that is securely coupled to frame 13. In one embodiment, outer race 136 is securely coupled with respect to structural support member 15 and/or frame 13. Structural support member 15 and/or frame 13 acts as a ground for the transfer of thrust loads and/or forces developed or generated by counter-rotating fan assembly 16 and/or booster compressor 24. Outer race 136 has a surface 137, generally opposing surface 133, which forms an outer groove 138 of thrust bearing assembly 130. At least one roller element, such as a plurality of rollers 139, is movably positioned between inner race 132 and outer race 136. Each roller 139 is in rolling contact with inner groove 134 and outer groove 138.

In one embodiment, a bearing assembly, such as roller bearing assembly 140, is positioned about the outer surface of cone 90 at or near aft end 94, as shown in FIG. 2. Roller bearing assembly 140 is connected between structural support 15 and cone 90. Roller bearing assembly 140 includes an inner race 142 that is mounted to cone 90 so that inner race 142 is rotatable about longitudinal axis 11 with second fan assembly 52. Roller bearing assembly 140 includes an outer race 146 that is mounted with respect to aft end of structural support 15, as shown in FIG. 2. At least one roller element, such as a plurality of rollers 149, is movably positioned between inner race 142 and outer race 146.

In this embodiment, roller bearing assemblies 130 and 140 facilitate providing rotational support to aft fan assembly 52 such that aft fan assembly 52 can rotate freely with respect to forward fan assembly 50. Accordingly, bearing assemblies 130 and 140 facilitate maintaining aft fan assembly 52 in a relatively fixed radial position within counter-rotating fan assembly 16. In alternative embodiments, any suitable bearing assembly known to those skilled in the art and guided by the teachings herein provided can be used for or in addition to bearing assembly 130 and/or bearing assembly 140.

In one embodiment, a bearing assembly, such as thrust bearing assembly 150, is positioned about the outer surface of support structure 15, as shown in FIG. 2. In one embodiment, thrust bearing assembly 150 acts as a differential bearing assembly in combination with a roller bearing assembly 152 to support booster compressor 24 and/or transfer thrust loads and/or forces from booster compressor 24 to frame 13. In one embodiment, thrust bearing assembly 150 includes an inner race 153 that is mounted with respect to support structure 15, an outer race 154 that is mounted to a forward end of booster compressor disk 72, and a plurality of rolling elements 155 coupled between inner race 153 and outer race 154, as shown in FIG. 2.

Roller bearing assembly 152 includes an inner race 156 that is mounted with respect to support structure 13, an outer race 157 that is mounted to an aft end of booster compressor disk 72, and a plurality of rolling elements 158 coupled between inner race 156 and outer race 157, as shown in FIG. 2.

In this embodiment, bearing assemblies 150 and 152 facilitate providing rotational support to booster compressor 24 such that booster compressor 24 can rotate freely with respect to forward fan assembly 50 and aft fan assembly 52. Accordingly, bearing assemblies 150 and 152 facilitate maintaining booster compressor 24 in a relatively fixed radial position within counter-rotating fan assembly 16. In alternative embodiments, any suitable bearing assembly known to those skilled in the art and guided by the teachings herein provided can be used for or in addition to bearing assembly 150 and/or bearing assembly 152.

FIG. 3 is an end view of gearbox 100 shown in FIG. 2. FIG. 4 is a side view of a portion of gearbox 100 shown in FIG. 3. As discussed previously herein, gearbox 100 is connected to a fixed or stationary component of gas turbine engine 10, such as frame 13 of core turbine engine 12, as shown in FIG. 2. In the exemplary embodiment, gearbox 100 includes a least one first or sun gear 300 that is coupled to input 104, and a plurality of second or planetary gears 302 that are each rotatably coupled to sun gear 300. Specifically, gearbox 100 includes sun gear 300 and a set of planetary gears 302 cooperating to produce differential speeds. Accordingly, sun gear 300 is directly coupled to shaft 34, via input 104, and planetary gears 302 are disposed to intermesh with sun gear 300 to facilitate driving aft fan assembly 52 and booster compressor 24 via output 106.

More specifically, gearbox 100 includes a unitary support structure also referred to as a gorilla cage that is configured to support sun gear 300 and planetary gears 302. In the exemplary embodiment, each planetary gear 302 is coupled to the support structure utilizing a fastener 304 such as a bolt for exampled that facilitates securing the planetary gears 302 within the support structure. Moreover, each planetary gear 302 includes a respective bearing assembly 306 such planetary gears 302 rotate freely with respect to sun gear 300.

In the exemplary embodiment, sun gear 300 has a diameter 340, each planetary gear 302 includes a first gear portion 350 having a first diameter 360 and a second gear portion 352 having a second diameter 362, that is greater than first diameter 360, and is coupled axially aft from first gear portion 360. In the exemplary embodiment, first and second gear portions are formed together such that each planetary gear 302 is a unitary structure. Optionally, first and second gear portions 350 and 352 are formed separately and coupled together using a fastener (not shown).

In the exemplary embodiment, sun gear diameter 340, first gear portion diameter 360 and second gear portion diameter 362 are selected based on the desired rotational speeds of second fan assembly 52 and booster compressor 24. For example, in one embodiment, shown in FIG. 4, sun gear 300 is meshed or drivingly coupled to first gear portion 350. Since first gear portion 350 has a diameter 360 that is less than the diameter 362 of second gear portion 352 the rotational speeds of both aft fan assembly 52 and booster compressor 24 will be set at a different rotational speed.

Optionally, as shown in FIGS. 5, 6, and 7, sun gear 300 is meshed or drivingly coupled to second gear portion 350. Since second gear portion 352 has a diameter 362 that is less than the diameter 360 of first gear portion 350 the rotational speed of the booster compressor 24 will be set at a second rotational speed that is greater than the first rotational speed of the aft fan assembly 52. Accordingly, during assembly, the sizes and/or diameters of each of sun gear 300, first gear portion 350 and second gear portion 352 can be varied to facilitate driving both aft fan assembly 52 and booster compressor 24 at the desired rotational speeds. Additionally, since aft fan assembly 52 is rotatably coupled to first gear portion 350 and booster compressor 24 is rotatably coupled to second gear portion 352, and each has a different diameter, the rotational speeds of both aft fan assembly 52 and booster compressor 24 are different, and can therefore be varied to further optimize the overall compression ratio of the gas turbine engine assembly.

The gas turbine engine assembly described herein includes a counter-rotating (CR) fan assembly having a geared single rotation (SR) low-pressure turbine. The assembly facilitates reducing at least some of the complexities associated with known counter-rotating low-pressure turbines. More specifically, the gas turbine engine assembly described herein includes a front fan assembly that is rotatably coupled to a single rotation low-pressure turbine through a first output from a dual-output gearbox, and an aft fan and booster assembly that are each driven by the low-pressure turbine via dual-output gearbox. Moreover, the gearbox includes a plurality of planetary gears, wherein each planetary gear includes a first portion driving the aft fan assembly and a second portion having a different diameter driving the booster compressor at a speed that is different than the speed of either the forward fan assembly or the aft fan assembly. Additionally, the gas turbine engine assembly described herein is configured such that approximately 40% of power generated by the low-pressure turbine is transmitted through the gearbox to the aft fan assembly to facilitate reducing gear losses. Therefore, in the event of a gearbox failure, i.e. the aft fan assembly ceases to rotate, the front fan assembly will continue to operate since it is directly driven by the low-pressure turbine.

As a result, the gas turbine engine assembly described herein facilitates increasing fan efficiency, reducing fan tip speed, and/or reducing noise. Moreover, since the gas turbine engine assembly described herein does not include a counter-rotating low-pressure turbine to drive the counter-rotating fan assemblies, various components such as, but not limited to, an outer rotating spool, a rotating rear frame, a second low-pressure turbine shaft, and a low-pressure turbine outer rotating seal are eliminated, thus reducing the overall weight of the gas turbine engine assembly. Moreover, in some gas turbine engine applications a mid turbine frame may be eliminated utilizing the methods and apparatuses described herein.

Exemplary embodiments of a gas turbine engine assembly that includes a gearbox coupled to a fan assembly are described above in detail. The components are not limited to the specific embodiments described herein, but rather, components of each system may be utilized independently and separately from other components described herein. The gearbox described herein can also be used in combination with other known gas turbine engines that include a forward and an aft fan assembly.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   coupling a gearbox to a single rotation low-pressure turbine, the gearbox including a plurality of planetary gears intermeshed with a sun gear, wherein each of the planetary gears includes a first gear portion having a first diameter and a second gear portion axially displaced from the first gear portion and having a second diameter different than the first diameter;
   coupling a first fan assembly directly to the single rotation low-pressure turbine so that the first fan assembly is not driven by the gearbox;
   coupling a second fan assembly to the first gear portion; and
   coupling the sun gear to one of the first gear portion and the second gear portion; and
   coupling a booster compressor to the second gear portion such that the single rotation low-pressure turbine is configured to drive the first fan assembly, the second fan assembly, and the booster compressor and such that the first fan assembly is rotatable in a first rotational direction and the second fan assembly is rotatable in a second rotational direction that is different than the first rotational direction.

2. A method in accordance with claim 1 further comprising coupling the first fan assembly to the single rotation low-pressure turbine such that the first fan assembly is rotatable at a first rotational speed that is different than a second rotational speed of the second fan assembly and the booster compressor.

3. A method in accordance with claim 1 further comprising coupling the second fan assembly to the first gear portion such that the second fan assembly is rotatable at a first rotational speed and coupling the booster compressor to the second gear portion such that the booster compressor is rotatable at a second rotational speed that is different than the first rotational speed.

4. A method in accordance with claim 1 wherein the sun gear has a third diameter that is selected based on a rotational speed of at least one of the first fan assembly, the second fan assembly, and the booster compressor, said method further comprising coupling the sun gear to the planetary gears such that the sun gear is rotatable at a first rotational speed and such that at least one of the second fan assembly and the booster compressor is rotatable at a second rotational speed that is different than the first rotational speed.

5. A method in accordance with claim 1 further comprising coupling the sun gear to each planetary gear such that the sun gear is intermeshed only with the first gear portion.

6. A method in accordance with claim 1 further comprising coupling the sun gear to each planetary gear such that the sun gear is intermeshed only with the second gear portion.

7. A counter-rotating fan assembly comprising:
   a gearbox comprising a sun gear coupled to a single rotation low-pressure turbine;
   a plurality of planetary gears intermeshed with said sun gear, each of said planetary gears comprising a first gear portion having a first diameter and a second gear portion axially displaced from the first gear portion and having a second diameter that is different than the first diameter;
   a first fan assembly directly coupled to said single rotation low-pressure turbine so that the first fan assembly is not driven by the gearbox;
   a second fan assembly coupled to said first gear portion; and
   the sun gear coupled to one of the first gear portion and the second gear portion; and
   a booster compressor coupled to said second gear portion such that said single rotation low-pressure turbine is configured to drive said first fan assembly, said second fan assembly, and said booster compressor and such that said first fan assembly is rotatable in a first rotational direction and said second fan assembly is rotatable in a second rotational direction that is different than the first rotational direction.

8. A counter-rotating fan assembly in accordance with claim 7 wherein said first fan assembly is rotatable at a first rotational speed that is different than a second rotational speed of said second fan assembly and said booster compressor.

9. A counter-rotating fan assembly in accordance with claim 7, wherein the first diameter is less than the second diameter such that said second fan assembly is rotatable at a first rotational speed and such that said booster compressor is rotatable at a second rotational speed that is greater than the first rotational speed.

10. A counter-rotating fan assembly in accordance with claim 7 wherein said sun gear has a diameter that is selected based on a rotational speed of at least one of said first fan assembly, said second fan assembly, and said booster compressor.

11. A counter-rotating fan assembly in accordance with claim 7 wherein said sun gear is intermeshed only with said first gear portion.

12. A counter-rotating fan assembly in accordance with claim 7 wherein said sun gear is intermeshed only with said second gear portion.

13. A turbine engine assembly comprising:
a core turbine engine;
a single rotation low-pressure turbine coupled to said core turbine engine;
a gearbox coupled to said single rotation low-pressure turbine, said gearbox comprising a sun gear and a plurality of planetary gears intermeshed with said sun gear, each of said planetary gears comprising a first gear portion having a first diameter and a second gear portion axially displaced from the first gear portion and having a second diameter that is different than the first diameter;
a first fan assembly directly coupled to said single rotation low-pressure turbine so that the first fan assembly is not driven by the gearbox;
a second fan assembly coupled to said first gear portion; and
the sun gear coupled to one of the first gear portion and the second gear portion; and
a booster compressor coupled to said second gear portion such that said single rotation low-pressure turbine is configured to drive said first fan assembly, said second fan assembly, and said booster compressor and such that said first fan assembly is rotatable in a first rotational direction and said second fan assembly is rotatable in a second rotational direction that is different than the first rotational direction.

14. A turbine engine assembly in accordance with claim 13 wherein said first fan assembly is rotatable at a first rotational speed that is different than a second rotational speed of said second fan assembly and said booster compressor.

15. A turbine engine assembly in accordance with claim 13 wherein the first diameter is less than the second diameter such that said second fan assembly is rotatable at a first rotational speed and said booster compressor is rotatable a second rotational speed that is different than the first rotational speed.

16. A turbine engine assembly in accordance with claim 13 wherein said sun gear has a third diameter that is selected based on a rotational speed of at least one of said first fan assembly, said second fan assembly, and said booster compressor.

17. A turbine engine assembly in accordance with claim 13 wherein said sun gear is intermeshed with only one of said first gear portion and said second gear portion.

* * * * *